US010259750B2

(12) United States Patent
Dünzen et al.

(10) Patent No.: US 10,259,750 B2
(45) Date of Patent: Apr. 16, 2019

(54) HYDRAULIC BINDER SYSTEM BASED ON ALUMINUM OXIDE

(71) Applicant: NABALTEC AG, Schwandorf (DE)

(72) Inventors: Christian Dünzen, Sulzbach-Rosenberg (DE); Tadeusz von Rymon Lipinski, Bonn (DE)

(73) Assignee: NABALTEC AG, Schwandorf (DE)

( * ) Notice: Subject to any disclaimer, the term of this patent is extended or adjusted under 35 U.S.C. 154(b) by 142 days.

(21) Appl. No.: 14/917,347

(22) PCT Filed: Aug. 29, 2014

(86) PCT No.: PCT/EP2014/068384
§ 371 (c)(1),
(2) Date: Mar. 8, 2016

(87) PCT Pub. No.: WO2015/036262
PCT Pub. Date: Mar. 19, 2015

(65) Prior Publication Data
US 2016/0214898 A1    Jul. 28, 2016

(30) Foreign Application Priority Data

Sep. 11, 2013    (EP) .................... 13183911

(51) Int. Cl.
| | | |
|---|---|---|
| *C04B 9/11* | (2006.01) | |
| *C04B 28/06* | (2006.01) | |
| *C04B 14/30* | (2006.01) | |
| *C04B 24/06* | (2006.01) | |
| *C04B 7/00* | (2006.01) | |
| *C04B 7/34* | (2006.01) | |
| *C04B 28/00* | (2006.01) | |
| *C04B 32/00* | (2006.01) | |
| *C04B 7/32* | (2006.01) | |
| *C04B 7/36* | (2006.01) | |
| *C04B 11/28* | (2006.01) | |
| *C04B 111/28* | (2006.01) | |

(52) U.S. Cl.
CPC ............ *C04B 28/06* (2013.01); *C04B 14/303* (2013.01); *C04B 24/06* (2013.01); *C04B 2111/28* (2013.01)

(58) Field of Classification Search
USPC ........................................ 106/692, 638, 695
See application file for complete search history.

(56) References Cited

U.S. PATENT DOCUMENTS 5,108,510 A    4/1992 Burge et al.
5,560,876 A * 10/1996 Boulanger ................ B01J 2/10
                                                    23/313 R

FOREIGN PATENT DOCUMENTS

| EP | 0839775 A1 * | 5/1998 | ............. C04B 28/06 |
|---|---|---|---|
| EP | 0839775 A1 | 5/1998 | |
| EP | 2679560 A2 * | 1/2014 | ............. C04B 28/02 |
| JP | 10081572 A | 3/1998 | |
| JP | 2005008496 A | 1/2005 | |
| JP | 2011047563 A | 3/2011 | |
| WO | 2012028419 A1 | 3/2012 | |

OTHER PUBLICATIONS

Racher et al., "Improvements in workability behavior of calcia free hydratable alumina binders", 2005, as supplied by applicants.*
Ted Dickson, TAK Industrial Mineral Consultancy; The Refractories Industry Worldwide 2012-2017; A Market/ Technology Report, p. 1.
Souza et al., Systematic Analysis of MgO hydration effects on alumina-magnesia refractory castables; Ceramic International, 38 (2012), 3969-3976.
Salamao et al., A Novel Magnesia Based Binder (MBB) for Refractory Castables; Ceramic Monographs 2.6.9, Supplement to Interceram 60 (2011) 1-4.
M W Vance et al.; Alcoa Industrial Chemicals; Steelplant Refractories Containing Alphabond Hydratable Alumina Binders.
Racher et al.; Improvements in Workability Behavior of Calcia-Free Hydratable Aluminia Binders, Proceedings of the Unified International.

* cited by examiner

*Primary Examiner* — James E McDonough
(74) *Attorney, Agent, or Firm* — Hoffmann & Baron, LLP

(57) ABSTRACT

The present invention relates to a hydraulic binder system based on calcined aluminum oxide for use in refractory materials. The invention further relates to a process for producing the hydraulic binder system and also to the use thereof.

17 Claims, No Drawings

HYDRAULIC BINDER SYSTEM BASED ON ALUMINUM OXIDE

CROSS REFERENCE TO RELATED APPLICATIONS

The present application is a National Stage Application claiming the priority of co-pending PCT Application No. PCT/EP2014/063957 filed Aug. 29, 2014, which in turn, claims priority from European Patent Application No. 13183911.0 filed Sep. 11, 2013. Applicants claim the benefits of 35 U.S.C. § 120 as to the PCT application and priority under 35 U.S.C. § 119 as to the said European Patent application, and the entire disclosures of both applications are incorporated herein by reference in their entireties.

The present invention relates to a hydraulic binder system based on calcined aluminum oxide for use in refractory materials. The invention further relates to a process for producing the hydraulic binder system and also to the use thereof.

Refractory products are used in all branches of industry in which it is necessary to carry out a process at high temperatures. This is the case in, for example, the sectors of metal winning and processing and in the cement, lime, gypsum, glass and ceramics industry.

The most important refractory products are shaped dense products (bricks, components), shaped heat-insulating products (lightweight fire bricks), unshaped refractory products (refractory concretes, ramming compositions, spray compositions, tamping compositions) or finished parts (moldings, blocks).

At present, about 41.5 million metric tons/year of refractory products are produced worldwide (Ted Dickson, TAK Industrial Mineral Consultancy; The Refractories Industry Worldwide 2012-2017; A Market/Technology Report, page 1). Among unshaped refractory products, refractory concretes occupy a very important position. The proportion they make up of total refractory production is increasing continually and in some industrial countries is significantly above 50%.

In refractory concretes, hydraulic binding on the basis of calcium aluminate (CA) cement is very widespread. Two types of cement in particular are generally employed as hydraulic binders; firstly, alumina cements containing from 40 to 50% by weight of aluminum oxide, 38% by weight of calcium oxide and from 4 to 15% by weight of iron oxide. Secondly, mention may be made of high-alumina cements containing from 70 to 80% by weight of aluminum oxide and from 20 to 30% by weight of calcium oxide.

Such CA cements are produced in a complicated and energy-intensive process from a mixture of an aluminum oxide carrier, for example alumina or aluminum hydroxide, and a calcium oxide carrier, for example calcium carbonate or calcium hydroxide, by sintering or melting at high temperatures. To achieve the required binding activity, the sintered material, known as clinker, subsequently has to be finely milled. A theoretical examination of the energy consumption for the necessary high-temperature firing shows that about 50% of the total energy is required exclusively for heating the aluminum oxide component to the process temperature.

A further significant disadvantage of the use of CA cements is the comparatively high calcium oxide content which can impair the corrosion resistance of a refractory concrete and, in combination with $SiO_2$, also the strength at high temperatures.

There is therefore a continual need for new, cement-free concretes.

Cement-free binder systems are already known.

Firstly, mention may be made of binding by means of colloidal silica. On drying, an $SiO_2$ binder framework is formed around the particles. $SiO_2$ binding is relatively weak at low temperatures. Concretes having such binding therefore require formwork and heating during setting. The $SiO_2$ component can have an adverse effect on the corrosion resistance and thermomechanical properties of the refractory concretes. A further industrially relevant disadvantage of this type of binding is the sensitivity to freezing, since the binder is destroyed by the action of freezing.

A further possibility for cement-free binding is binding by means of water glass. The binding mechanisms and the binding properties resemble those of colloidal silica. However, the alkalis introduced with the water glass permanently impair the thermomechanical properties and the corrosion resistance of the refractory material.

In the case of phosphate binding, phosphoric acid or aluminum salts thereof are employed as binder in most cases. A satisfactory binding force is generally developed only by means of a polycondensation reaction which is initiated by heating to above 200° C. The presence of phosphate ions is often a serious disadvantage of this type of binding.

Furthermore, magnesia binders (for example as in Sorel cement) are used. Here, a magnesium chloride/sulfate solution reacts with magnesium oxide or hydroxide to form sparingly soluble salts, known as magnesium oxychlorides/oxysulfates. However, these binders are assigned to the group of chemical binders and thus do not represent hydraulic binders. Such magnesia binders liberate highly corrosive vapors ($HCl/SO_2$) in high-temperature applications.

A further possibility for cement-free binding is the use of hydratable alumina, viz. rho alumina. This binder, too, has only low strengths at room temperature. The processing of refractory concretes in which rho alumina is used as hydraulic binder is more critical than that of cement-bonded concretes since the chemically bound water is liberated in a comparatively very narrow temperature range around 150° C. After dehydration, a large decrease in strength additionally occurs at about 1000° C. Only above temperatures of about 1250° C. does the strength increase greatly as a result of incipient sintering of the alumina binder phase. Rho alumina is a transition modification of aluminum oxide. The specific surface area of commercially available rho alumina is >200 $m^2/g$. This high specific surface area makes dispersing difficult and thus impairs the processability of fresh concretes which contain rho alumina as binder. The setting mechanism is based on rho alumina reacting with water at room temperature and forming an aluminum hydroxide gel which solidifies over the course of the further reaction. In contrast to, for example, the hydrates of cement, which precipitate as fine crystals and give the concrete a high permeability, the solidified gel of rho alumina forms a dense structure which hinders drying of the concrete. If attention is not paid to this property of rho alumina and to rapid heating of the refractory concrete to temperatures of 200-400° C., rho alumina-bonded concretes tend to rupture. When a concrete is first heated to a temperature above 1000° C., rho alumina and all hydration and dehydration products thereof are converted into alpha-aluminum oxide. This phase transformation is associated with a volume shrinkage and, depending on the grain structure of the concrete, leads either to macroscopic shrinkage of the component or the lining or to an increase in porosity. While the first effect can lead to tearing or even failure of a lining, the second effect results in impairment of the corrosion resistance.

Nevertheless, concretes having rho alumina binding are superior in terms of corrosion resistance and high-temperature resistance to those having cement binding. The reason for this is the absence of calcium oxide.

EP 0839 775 A1 describes hydraulically bound (setting), calcium oxide-free refractory products which comprise both rho alumina and magnesium oxide. The magnesium oxide is used as DBM (dead burned magnesia) grade (unreactive). The contents in the concrete are 4-16%. The combination of rho alumina with magnesium oxide improves strength, accelerates setting and increases the water requirement compared to concretes having pure rho alumina binding, but there remain disadvantages due to the use of rho alumina, for example the volume shrinkage and the tendency to rupture because of the low permeability.

Souza et al., Systematic Analysis of MgO hydration effects on alumina-magnesia refractory catsables, Ceramic International, 38, 2012, 3969 to 3976, describe the hydraulic setting of a plasticized α-alumina concrete doped with DBM ("dead burned magnesia"), where hydration of the magnesium oxide leads to crack formation in the concretes. This crack formation is prevented by use of $SiO_2$-contaminated magnesium oxide or addition of microsilica.

Salamao et al., A Novel Magnesia Based Binder (MBB) for Refractory Castables, Ceramic Monographs 2.6.9, Supplement to Interceram, 2011, 1 to 4, likewise describe magnesia-based binders for producing refractory casting compositions. For this purpose, comparatively large amounts of magnesia are required in order to achieve setting. Setting occurs at about 50° C. and about 100% relative atmospheric humidity.

It is an object of the present invention to provide a hydraulic binder system for use in refractory materials, which does not display the disadvantages of the known binder systems. In particular, a hydraulic binder system which has good mechanical properties and also controllable setting times at room temperature is to be provided. Furthermore, such a binder system should also display a high permeability of the set concrete and thus good drying properties and contain neither transition modifications of aluminum oxide which can experience a volume shrinkage on conversion into alpha-aluminum oxide nor calcium oxide.

The object is achieved by a hydraulic binder system for use in refractory materials, comprising
  a) from 90.0 to 99.99% by weight of at least one calcined aluminum oxide A having an average particle size of from 0.3 to 25.0 μm and a BET surface area of from 0.5 to 30.0 $m^2/g$; and
  b) from 0.01 to 10.0% by weight of at least one component B selected from the group consisting of magnesium hydroxide, calcium hydroxide, strontium hydroxide, barium hydroxide and hydrates thereof, magnesium oxide, calcium oxide, strontium oxide and barium oxide;
where the respective proportions by weight are based on the total amount of the hydraulic binder system.

It has now surprisingly been found that addition of small amounts of at least one component B enables a setting reaction of the at least one calcined aluminum oxide A with water to be triggered. Furthermore, it has been found that setting can occur even at room temperature. The setting reaction occurs without addition of cement. Furthermore, setting occurs without addition of calcined aluminum oxide having a specific surface area of >30 $m^2/g$, like, for example, rho alumina.

Accordingly, the hydraulic binder system of the invention does not contain any cement. Preference is likewise given to the hydraulic binder system of the invention containing no calcined aluminum oxide having a specific surface area of >30 $m^2/g$.

Refractory concrete produced using the hydraulic binder system of the invention has at least a comparable consistency, a comparable setting time, a comparable strength and a comparable high-temperature resistance as refractory concrete produced using a hydraulic binder system according to the prior art, e.g. cement or rho alumina.

Refractory concrete produced using the hydraulic binder system of the invention can have, in particular, a lower shrinkage on firing compared to refractory concrete produced using a hydraulic binder system according to the prior art, e.g. cement or rho alumina.

Refractory concrete produced using the hydraulic binder system of the invention can also display better drying behavior and better corrosion and infiltration resistance compared to refractory concrete produced using a hydraulic binders system according to the prior art, e.g. cement or rho alumina.

Unless explicitly indicated otherwise, the particle sizes mentioned are average particle sizes $D_{50}$. For the indicated value, 50% of all particles are larger and 50% of all particles are smaller. The determination of particle sizes is preferably carried out by means of laser granulometry in accordance with ISO 13320.

The determination of the specific surface area was carried out by nitrogen adsorption (BET) in accordance with DIN ISO 9277.

Calcined Aluminum Oxide A

The hydraulic binder system of the invention contains from 90.0 to 99.99% by weight, preferably from 95.0 to 99.9% by weight, preferably from 96.0 to 99.8% by weight, preferably from 97.0 to 99.7% by weight, preferably from 98.0 to 99.5% by weight, of at least one calcined aluminum oxide A. Here, the at least one calcined aluminum oxide A has an average particle size of from 0.3 to 25.0 μm and a specific BET surface area of from 0.5 to 30.0 $m^2/g$. The hydraulic binder system of the invention can thus have precisely one, two, three, four or more calcined aluminum oxides A having the properties indicated above.

The at least one calcined aluminum oxide A can be obtained by processes with which a person skilled in the art will be familiar. For example, the at least one calcined aluminum oxide A can be obtained from commercial aluminum hydroxide produced in a Bayer process by thermal treatment (calcination) and subsequent milling.

Calcination can be carried out, inter alia, at temperatures of from 1200 to 1800° C. in an aluminum oxide crucible or a gas-heated rotary furnace. The subsequent milling can, for example, be carried out in a planetary ball mill, but can also be carried out in any other industrial mill, for example wet and dry ball mills, stirred and attritor mills, annular gap mills or jet mills.

The at least one calcined aluminum oxide A in the hydraulic binder system of the invention is preferably
a) at least one calcined aluminum oxide A1 having an average particle size of from 1.8 to 8.0 μm, preferably from 1.9 to 6.5 μm, particularly preferably from 2.0 to 4.5 μm, and a specific BET surface area of from 0.5 to 2.0 $m^2/g$, preferably from 0.75 to 1.5 $m^2/g$; or b) at least one calcined aluminum oxide A2 having an average particle size of from 0.3 to 1.7 µm, preferably from 0.5 to 1.5 µm, preferably from 0.6 to 1.2 µm, and a specific BET surface area of from 2.0 to 10.0 m$^2$/g, preferably from 4.0 to 8.0 m$^2$/g.

In a preferred embodiment, the invention provides a hydraulic binder system containing at least two different calcined aluminum oxides A. There can likewise be precisely two different calcined aluminum oxides A.

In particular, these calcined aluminum oxides are the above-described aluminum oxides A1 and A2. Accordingly, the hydraulic binder system preferably contains
a) at least one calcined aluminum oxide A1 having an average particle size of from 1.8 to 8.0 µm, preferably from 1.9 to 6.5 µm, particularly preferably from 2.0 to 4.5 µm, and a specific BET surface area of from 0.5 to 2.0 m$^2$/g, preferably from 0.75 to 1.5 m$^2$/g; and
b) at least one calcined aluminum oxide A2 having an average particle size of from 0.3 to 1.7 µm, preferably from 0.5 to 1.5 µm, preferably from 0.6 to 1.2 µm, and a specific BET surface area of from 2.0 to 10.0 m$^2$/g, preferably from 4.0 to 8.0 m$^2$/g.

The ratio of the proportions by weight of the calcined aluminum oxides A1 and A2 in the hydraulic binder system is preferably in the range from 0.1:9 to 9:0.1; preferably from 1:4 to 4:1, preferably from 1:3 to 3:1 and particularly preferably from 1:2 to 2:1.

In a further preferred embodiment, the ratio of the proportions by weight of the calcined aluminum oxides A1 and A2 in the hydraulic binder system is 1:1.

The at least one calcined aluminum oxide A can be present in coated or uncoated form.

In a preferred embodiment, the at least one calcined aluminum oxide A is coated. If a plurality of aluminum oxides are present, these can each be, independently of one another, uncoated or coated. In addition, each aluminum oxide can be present in both coated form and uncoated form. For example, if two aluminum oxides such as the above aluminum oxides A1 and A2 are present, both can be coated or uncoated. Furthermore, only one aluminum oxide can be coated. It is thus possible for A1 and A2 to be uncoated. It is also possible for A1 to be coated and A2 to be uncoated. Furthermore, A1 can be uncoated and A2 can be coated. Finally, both A1 and A2 can be coated. If a plurality of aluminum oxides are present, these are preferably all coated or uncoated.

Suitable coating agents are, for example, phosphoric acid and salts thereof; the coating agent is preferably phosphoric acid. The surface of the at least one calcined aluminum oxide A can be additionally activated by means of the coating.

Coating of the at least one calcined aluminum oxide A is preferably carried out by mixing the aluminum oxide with dilute phosphoric acid, where the phosphoric acid has a concentration of from 0.1 to 1.0% by weight, preferably from 0.3 to 0.8% by weight, and subsequently drying the mixture. The amounts of the at least one calcined aluminum oxide and the dilute phosphoric acid are preferably selected so that from 0.0001 to 0.003 g of phosphoric acid are used per g of aluminum oxide A. Drying is preferably carried out at a temperature of from 100 to 150° C.

In a preferred embodiment, the binder system of the invention contains at least one coated aluminum oxide A, which is preferably A1 or A2.

In a further preferred embodiment, the hydraulic binder system contains at least two coated aluminum oxides A, with preference being given to the one being A1 and the other being A2.

Furthermore, the hydraulic binder system preferably contains coated and uncoated aluminum oxide A1 and coated and uncoated aluminum oxide A2.

Furthermore, the hydraulic binder system preferably contains coated or uncoated aluminum oxide A1 and coated or uncoated aluminum oxide A2.

Furthermore, the hydraulic binder system preferably contains coated and uncoated aluminum oxide A1 and coated or uncoated aluminum oxide A2.

Furthermore, the hydraulic binder system preferably contains coated or uncoated aluminum oxide A1 and coated and uncoated aluminum oxide A2.

In a further preferred embodiment, the hydraulic binder system contains, in addition to the abovementioned combinations of coated/uncoated A1 and/or A2, at least one further calcined aluminum oxide A, where the at least one further aluminum oxide A is a calcined aluminum oxide A which is not A1 or A2 and which is coated or uncoated.

Component B

The hydraulic binder system of the invention also contains from 0.01 to 10.0% by weight, preferably from 0.05 to 4.95% by weight, preferably from 0.1 to 3.9% by weight, preferably from 0.15 to 2.85% by weight, particularly preferably from 0.3 to 1.8% by weight, of at least one component B selected from the group consisting of magnesium hydroxide, calcium hydroxide, strontium hydroxide, barium hydroxide and hydrates thereof, magnesium oxide, calcium oxide, strontium oxide and barium oxide.

If a hydrate of magnesium hydroxide, calcium hydroxide, strontium hydroxide or barium hydroxide is used as component B, the proportions by weight indicated for the at least one component B in the binder system of the invention in each case relate to the proportions by weight of the corresponding hydrate-free hydroxide in the binder system.

The component B is a component which induces the at least one calcined aluminum oxide A to undergo a setting reaction or together with the at least one calcined aluminum oxide A and water undergoes a hydraulic reaction.

The at least one component B is preferably selected from the group consisting of calcium hydroxide, strontium hydroxide, barium hydroxide, hydrates thereof and magnesium oxide.

Furthermore, the at least one component B is preferably selected from the group consisting of magnesium oxide, calcium hydroxide, hydrates of strontium hydroxide and hydrates of barium hydroxide. The hydrates of strontium hydroxide and barium hydroxide are preferably strontium hydroxide 8-hydrate and barium hydroxide 8-hydrate.

The component B preferably has an average particle size of from 1.0 to 20.0 µm and a specific BET surface area of from 0.5 to 50.0 m$^2$/g, preferably from 0.5 to 25.0 m$^2$/g.

In a preferred embodiment, the at least one component B is a magnesium oxide. The magnesium oxide preferably has an average particle size of from 1.0 to 10.0 µm, preferably from 1.5 to 7.0 µm, preferably from 2.0 to 5.0 µm, and a specific BET surface area of from 5.0 to 20.0 m$^2$/g, preferably from 10.0 to 18.0 m$^2$/g, preferably from 13.0 to 17.0 m$^2$/g.

In a further preferred embodiment, the at least one component B is a calcium hydroxide or hydrate thereof, particularly preferably a calcium hydroxide. The calcium hydroxide preferably has an average particle size of from 1.0 to 10.0 µm, preferably from 1.5 to 7.0 µm, preferably from 2.0 to 5.0 µm, and a specific BET surface area of from 5.0 to 20.0 m$^2$/g, preferably from 8.0 to 18.0 m$^2$/g, preferably from 11.0 to 15.0 m$^2$/g.

In a further preferred embodiment, the at least one component B is a strontium hydroxide or hydrate thereof, particularly preferably a hydrate thereof. The strontium hydroxide or hydrate thereof preferably has an average particle size of from 5.0 to 20.0 µm, preferably from 9.0 to 17.0 µm, preferably from 11.0 to 15.0 µm, and a specific BET surface area of from 1.0 to 13.0 m$^2$/g, preferably from 2.0 to 10.0 m$^2$/g, preferably from 3.0 to 7.0 m$^2$/g.

In a further preferred embodiment, the at least one component B is a barium hydroxide or hydrate thereof, in particular a hydrate thereof. The barium hydroxide or hydrate thereof preferably has an average particle size of from 5.0 to 20.0 µm, preferably from 9.0 to 17.0 µm, preferably from 11.0 to 14.0 µm, and a specific BET surface area of from 1.0 to 15.0 m$^2$/g, preferably from 2.0 to 12.0 m$^2$/g, preferably from 6.0 to 10.0 m$^2$/g.

Plasticizer C

The hydraulic binder system of the invention can also contain from 0.05 to 4.95% by weight, preferably from 0.1 to 3.9% by weight, preferably from 0.15 to 2.85% by weight, particularly preferably from 0.2 to 1.7% by weight, of at least one plasticizer C.

For the purposes of the present invention, plasticizers are substances which can serve to improve the processing properties of the hydraulic binder system of the invention. Such substances frequently have surface-active or pH-influencing properties.

The addition of a plasticizer enables the processability to be improved at the same water content and/or the amount of water used to be reduced at the same processability, as a result of which the strength of the refractory material obtained is increased.

Suitable plasticizers C for the hydraulic binder system of the invention are generally known to those skilled in the art. Suitable plasticizers are, inter alia, lignosulfonates, ligno-sulfonic acid; naphthalenesulfonates, melamine-formaldehyde sulfates; polycarboxylic acids, for example polyacrylic acid homopolymers, polymethacrylic acid homopolymers, polyacrylic acid-polymethacrylic acid copolymers or polyacrylic acid-maleic acid copolymers and salts thereof polyacrylic esters; modified polycarbonxylic acids, for example polycarboxylic acid ethers (PCE) having short or long side chains, for example obtainable as CASTAMENT FS 10 (BASF SE), CASTAMENT FS 20 (BASF SE), VISCO-CRETE 225P (Sika Deutschland GmbH), polyacrylic acid ethers; styrene-maleic acid copolymers; hydroxycarboxylic acids, for example citric acid or tartaric acid and salts thereof; carboxylic acids, for example oxalic acid, formic acid or acetic acid and salts thereof. Further suitable plasticizers are inorganic acids, for example boric acid, phosphoric acid, amidosulfonic acid, silicic acids and salts thereof and polyacids, for example silicates or polyphosphates. Of course, mixtures of two or more of the plasticizers C listed are also possible.

The at least one plasticizer C is particularly preferably citric acid or a salt thereof. Preference is given to alkali metal salts of citric acid, more preferably trilithium or trisodium citrate.

The at least one plasticizer C is particularly preferably trisodium citrate.

In a preferred embodiment, the hydraulic binder of the invention contains not more than one plasticizer C.

In a further preferred embodiment, the binder system of the invention contains more than one plasticizer C. If more than one plasticizer C is present in the binder system of the invention, a combination of citric acid or a salt thereof and a modified polycarboxylic acid, preferably a polycarboxylic acid ether (PCE), and optionally further plasticizers C is preferably present.

In a preferred embodiment of the invention, the hydraulic binder system consists of only the components A, B and C.

The hydraulic binder system of the invention can contain further additives in addition to the plasticizer C. These are conventional additives with which a person skilled in the field of hydraulic binders and binder-containing compositions will be familiar, for example stabilizers, air pore formers, setting accelerators, curing accelerators, retarders or sealants.

In a preferred embodiment, the hydraulic binder system of the invention is present in at least partially premixed form of the components present therein.

In this context, the expression "at least partially" means that either at least two but not all of the components of the hydraulic binder system are provided in premixed form and/or that in each case only a particular proportion by weight of the individual components is provided in premixed form.

However, it is also possible for at least one calcined aluminum oxide A, the at least one component B, optionally the at least one plasticizer C and optionally further components of the hydraulic binder system to be provided separately.

However, the binder system is particularly preferably provided as a mixture containing the total amount of the at least one calcined aluminum oxide A, the at least one component B, optionally the at least one plasticizer C and optionally further components.

Process for Producing the Hydraulic Binder System

The invention further provides a process for producing the hydraulic binder system of the invention.

Accordingly, a process for producing the hydraulic binder system of the invention, which comprises the step:
a) mixing of
   from 90.0 to 99.99% by weight of at least one calcined aluminum oxide A having an average particle size of from 0.3 to 25.0 µm and a BET surface area of from 0.5 to 30.0 m$^2$/g with
   from 0.01 to 10.0% by weight of at least one component B selected from the group consisting of magnesium hydroxide, calcium hydroxide, strontium hydroxide, barium hydroxide and hydrates thereof, magnesium oxide, calcium oxide, strontium oxide and barium oxide;
where the respective proportions by weight are based on the total amount of the hydraulic binder system,
has been provided.

As regards the process for producing the hydraulic binder system, the preferred embodiments which have been mentioned above in connection with the hydraulic binder system of the invention apply.

In a preferred embodiment, from 0.05 to 4.95% by weight of at least one plasticizer C is added during or after step a) of the process.

The mixing of the at least one aluminum oxide A with at least one component B and optionally at least one plasticizer C can be carried out in all ways known to those skilled in the art, with the components A, B and optionally C being able to be added in any order.

In a preferred embodiment, the mixing of the at least one calcined aluminum oxide A with the at least one component B and optionally with at least one plasticizer C in step a) is carried out by joint milling (comilling).

Comilling of the at least one aluminum oxide A with the at least one component B enables the setting time of the hydraulic binder system to be shortened and its binding force to be influenced in a positive manner.

In one embodiment, the at least one plasticizer C is added during step a).

In a further embodiment, the at least one plasticizer C is added after step a).

The milling of the at least one aluminum oxide A with the at least one component B and optionally with at least one plasticizer C can be carried out in all ways known to those skilled in the art, for example in planetary ball mills and other industrial mills such as dry ball mills, stirred and attritor mills, annular gap mills or jet mills. The addition of the individual components A, B and optionally C can be carried out in any order.

Milling is preferably carried out in the absence of water.

Use of the Hydraulic Binder System

The hydraulic binder system of the invention is particularly suitable for producing refractory materials and fine-ceramic materials.

The hydraulic binder system is preferably used for producing refractory materials. These can be, for example, tamping compositions, vibration concretes or self-flowing concretes.

Here, the refractory materials contain from 5 to 70% by weight, preferably from 15 to 50% by weight, particularly preferably from 20 to 40% by weight, of the hydraulic binder system of the invention, based on the sum of all components in the refractory materials.

The hydraulic binder system of the invention is also suitable for producing optionally refractory ceramic objects composed of fine-grained aluminum oxide or optionally refractory fine-ceramic materials having proportions of aluminum oxide, with shaping by slip casting or injection molding being particularly useful.

Here, the ceramic objects or fine-ceramic materials can also consist of only the hydraulic binder system.

The ceramic objects or fine-ceramic materials are preferably refractory.

The refractory materials can be produced by all processes with which a person skilled in the art would be familiar.

For example, the coarse constituents of the refractory composition can firstly be stirred with water, and the hydraulic binder of the invention can subsequently be added in premixed form. Furthermore, a homogeneous composition can firstly be produced from the hydraulic binder system in premixed form and water and this can subsequently be mixed with the respective coarse constituents.

It is also possible for the components A, B, optionally C and optionally further components of the hydraulic binder system to be added individually to the coarse constituents of the refractory compositions.

For example, water can optionally firstly be mixed with at least one plasticizer C and subsequently added to a mixture of the components A and B and the coarse constituents. The components A, B and the coarse constituents are preferably premixed dry with one another before the addition of the water, optionally containing at least one plasticizer C.

Furthermore, it is possible firstly to mix at least one calcined aluminum oxide A and optionally at least one plasticizer C with water, add this mixture to the coarse constituents and subsequently add at least one component B.

However, the individual components of the hydraulic binder system are preferably used in a premixed form containing the total amount of the at least one calcined aluminum oxide A, the at least one component B, optionally the at least one plasticizer C and optionally further components.

The setting time of the refractory composition can be controlled by selection of the respective components A, B and optionally C. This enables setting times in the range from 1 minute to 20 hours to be achieved.

The following examples illustrate the invention.

Unless explicitly indicated otherwise, the particle sizes mentioned are average particle sizes $D_{50}$. For the indicated value, 50% of all particles are larger and 50% of all particles are smaller. The determination of the particle sizes was carried out by means of laser granulometry in accordance with ISO 13320.

The determination of the specific surface area was carried out by nitrogen adsorption (BET) in accordance with DIN ISO 9277.

The setting time was determined in accordance with EN 196 (Vicat test), and the determination of the cold compressive strength was carried out in accordance with EN 1402.

A) Production of the Starting Materials

The starting materials AO1 to AO3 were produced from commercial Bayer process aluminum hydroxide having an average particle size of 80 μm and a technical purity of $Al(OH)_3$>99% (for example obtainable from Aluminiumoxid Stade, Stade.

1. Production of Aluminum Oxide AO1

Calcination:

The thermal treatment of the aluminum hydroxide was carried out in an electrically heated furnace from Nabertherm, using an aluminum oxide crucible having a volume of about 2 l as calcination vessel. The calcination was carried out for four hours at a temperature of 1300° C.

Milling:

The milling of the calcination product was carried out in a planetary ball mill PM 100 from Retsch. Here, 60 g of calcined material were milled for 20 minutes using 200 g of aluminum oxide milling balls (diameter 0.5-1 cm).

The resulting aluminum oxide had a specific BET surface area of 7.0 m²/g and an average particle size of 0.8 μm. The purity was 99.6% of $Al_2O_3$. The α-alumina content was >90%.

2. Production of Aluminum Oxide AO2

Calcination:

The thermal treatment of the aluminum hydroxide was carried out in an electrically heated furnace from Nabertherm, using an aluminum oxide crucible having a volume of about 2 l as calcination vessel. The calcination was carried out for four hours at a calcination temperature of 1650° C.

Milling:

The milling of the calcination product was carried out in a planetary ball mill PM 100 from Retsch. Here, 60 g of calcined material were milled for five minutes using 200 g of aluminum oxide milling balls (diameter 0.5-1 cm).

The resulting aluminum oxide had a specific BET surface area of 1.0 m²/g and an average particle size of 4.0 μm. The purity was 99.6% of $Al_2O_3$. The α-alumina content was >90%.

3. Production of Aluminum Oxide AO3

Calcination:

The thermal treatment of the aluminum hydroxide was carried out in an electrically heated furnace from Nabertherm, using an aluminum oxide crucible having a volume of about 2 l as calcination vessel. The calcination was carried out for four hours at a calcination temperature of 1650° C.

Milling:

The milling of the calcination product was carried out in a planetary ball mill PM 100 from Retsch. Here, 60 g of calcined material were milled for ten minutes using 200 g of aluminum oxide milling balls (diameter 0.5-1 cm).

The resulting aluminum oxide had a specific BET surface area of 1.7 m²/g and an average particle size of 2.0 μm. The purity was 99.6% of Al₂O₃. The α-alumina content was >90%.

B) USE EXAMPLES

Example 1: Setting Behavior of a Fine-Grained Base Composition Composed of Calcined Aluminas

TABLE 1

Constitution of the fine-grained base composition

| Constitution of base composition [% by weight] | Constituents |
|---|---|
| 84.30 | Binder system as per Table 2 |
| 15.70 | Make-up water |

TABLE 2

Constitution of the hydraulic binder system

| Constitution of binder [% by weight] | | Constituents | Particle size $D_{50}$ | Specific BET surface area [m²/g] |
|---|---|---|---|---|
| 99.64 | A | AO1 | 0.8 μm | 7.0 |
| 0.28 | B | Magnesium oxide[1] | 3.0 μm | 16.3 |
| 0.07 | C | Plasticizer system[2] | 0.8 μm | 7.0 |

[1]caustic calcined, from Nedmag, the Netherlands
[2]plasticizer system (72% of citric acid, 28% of acetic acid; both reagent grade from Merck)

Experimental Procedure

The calcined alumina was converted into a slip by addition of magnesium oxide, plasticizer system and water and intensive mixing. The finished mixture was poured into plastic molds and stored in a closed container at room temperature for 27 hours. The setting time of the mixture was determined by means of the Vicat test. Apparent density (from the weight and volume of the test specimen) and cold compressive strength were determined on the set and demolded test specimens (46×46 mm). The results obtained are shown in Table 3.

TABLE 3

Setting behavior of the fine-grained base composition containing magnesium oxide

| Setting time [min] | Apparent density [g/cm³] | Cold compressive strength [N/mm²] |
|---|---|---|
| 120 | 2.19 | 2.0 |

The demolded test specimens were fired at 1625° C. for 3 hours. Table 4 shows the properties of the sintered aluminum oxide ceramic:

TABLE 4

Properties of the sintered aluminum oxide ceramic

| Drying shrinkage (110° C.) | Sintering shrinkage (1625° C.) | Sintered density (1625° C.) |
|---|---|---|
| 1.46% | 14.95% | 3.57 g/cm³ |

Example 2: Influence of the Amount of Magnesium Oxide on the Setting of an α-Alumina Concrete

TABLE 5

Constitution of the self-flowing α-alumina concrete

| Constitution of concrete [% by weight] | Constituents | Particle size $D_{50}$ |
|---|---|---|
| 39.0 | Sintered α-alumina T60[1] | 1-3 mm |
| 7.8 | Sintered α-alumina T60[1] | 0.5-1 mm |
| 15.0 | Sintered α-alumina T60[1] | <0.5 |
| 8.86 | Sintered α-alumina T60[1] | <45 μm |
| 23.45 | Binder system as per Table 6 | — |
| 5.63-5.65 | Make-up water | — |

[1]from Almatis GmbH, Germany

TABLE 6

Constitution of the hydraulic binder system

| Constitution of binder [% by weight] | | Constituents | Particle size $D_{50}$ | Specific BET surface area [m²/g] |
|---|---|---|---|---|
| 9.08 | A | AO1 | 0.8 μm | 7.0 |
| 90.26-88.70 | A | AO2 | 4.0 μm | 1.0 |
| 0.08-2.00 | B | Magnesium oxide[2] | 3.0 μm | 16.3 |
| 0.21 | C | Plasticizer system[3] | 0.8 μm | 7.0 |

[2]caustic calcined, from Nedmag, the Netherlands
[3]trisodium citrate, reagent grade Experimental Procedure A homogeneous slip was firstly produced from the calcined aluminas by addition of plasticizer system and make-up water and intensive mixing. This slip was subsequently mixed with the sintered α-alumina particles. The magnesium oxide was subsequently added. The finished concrete mixture was poured into plastic molds and stored at room temperature in a closed container for 27 hours. The setting time of the mixture was determined by means of the Vicat test. The cold compressive strength was determined on the set and demolded test specimens (46×46 mm). The results are shown in Table 7.

TABLE 7

Influence of the amount of magnesium oxide on the setting of an α-alumina concrete

| Magnesium oxide in concrete/in binder [% by weight] | Setting time [min] | Cold compressive strength [N/mm²] |
|---|---|---|
| 0.02/0.08 | 5500 | 1.0 |
| 0.06/0.26 | 1500 | 5.8 |
| 0.24/1.02 | 960 | 7.3 |
| 0.35/1.49 | 490 | 6.4 |
| 0.47/2.00 | 210 | 7.7 |

It was able to be shown that the addition of even a small amount of magnesium oxide brought about setting of the α-alumina concrete. Furthermore, it was able to be shown that the setting time and the cold compressive strength of the set test specimens can be set via the amount added.

Example 3: Influence of the BET Surface Area of Magnesium Oxide on the Setting of an α-Alumina Concrete

TABLE 8

Constitution of the self-flowing α-alumina concretes

| Constitution of concrete [% by weight] | Constituents | Particle size $D_{50}$ |
|---|---|---|
| 38.9 | Sintered α-alumina T60[1] | 1.0-3.0 mm |
| 7.9 | Sintered α-alumina T60[1] | 0.5-1.0 mm |
| 14.9 | Sintered α-alumina T60[1] | <0.5 mm |
| 8.9 | Sintered α-alumina T60[1] | <45 μm |
| 23.8 | Binder system as per Table 9 | — |
| 5.6 | Make-up water | — |

[1]from Almatis GmbH, Germany

TABLE 9

Constitution of the hydraulic binder system

| Composition of binder [% by weight] | Constituents | Particle size $D_{50}$ | Specific BET surface area [m$^2$/g] |
|---|---|---|---|
| 88.3 | A AO2 | 4.0 μm | 1.0 |
| 10.1 | A AO1 | 0.8 μm | 7.0 |
| 0.8 | B Magnesium oxide[2] | see Table 6 | |
| 0.8 | C Plasticizer system[3] | — | — |

[2]caustic calcined, from Nedmag, the Netherlands
[3]from 65 to 87.5% by weight of polycarboxylic acid ether (PCE), from 12 to 32.5% by weight of citric acid, from 0.1 to 1.4% by weight of amidosulfonic acid, from 0.1 to 1.4% by weight of silicon dioxide (for example 66.7% by weight of CASTAMENT FS 20 and 33.3% by weight of Castament FS 10, both obtainable from BASF SE).

α-Alumina concretes containing untreated magnesium oxide which had been heated at 600° C. and at 1000° C. were examined. As a measure of the reactivity, the specific surface area was determined by the BET method.

TABLE 10

Parameters of the magnesium oxide species examined

| Heating temperature of magnesium oxide | Particle size distribution | | | Specific BET surface area [m$^2$/g] |
|---|---|---|---|---|
| | $D_{90}$ [μm] | $D_{50}$ [μm] | $D_{10}$ [μm] | |
| not heated | 11.0 | 3.0 | 0.7 | 16.3 |
| 600° C. | 11.0 | 3.0 | 0.7 | 14.5 |
| 1000° C. | 11.0 | 3.0 | 0.7 | 2.0 |

Experimental Procedure

A clear solution was produced from plasticizer system and make-up water. The other constituents of the formulation were firstly premixed dry for one minute, ⅔ of the water/plasticizer mixture were subsequently added and the mixture was mixed for three minutes. Finally, the remainder of the water/plasticizer mixture was added and the mixture was mixed until the composition became flowable (about 2 minutes).

The concrete mixtures prepared in this way were poured into plastic molds and stored at room temperature in a closed container for 24 hours. The setting time of the concrete mixtures was determined by means of the Vicat test. The test specimens were dried at 110° C. for 24 hours. Apparent density (from the weight and volume of the test specimen) and cold compressive strength were determined on set, dried test specimens (46×46 mm). The results are shown in Table 11.

TABLE 11

Influence of the specific surface area of magnesium oxide on the setting of an α-alumina concrete

| Heating temperature | Specific BET surface area [m$^2$/g] | Setting time [min] | Apparent density [g/cm$^3$] | Cold compressive strength [N/mm$^2$] |
|---|---|---|---|---|
| not heated | 16.3 | 960 | 3.00 | 7.3 |
| 600° C. | 14.5 | 1560 | 3.03 | 8.3 |
| 1000° C. | 2.0 | 2760 | 2.94 | 2.5 |

It was able to be shown that the setting time of the self-flowing α-alumina concrete is shortened by increasing the BET surface area of the magnesium oxide.

Example 4: Influence of Various Alkaline Earth Metal Oxides/Hydroxides on the Setting of an α-Alumina Concrete a) Magnesium Oxide

TABLE 12

Constitution of the self-flowing α-alumina concretes

| Constitution of concrete [% by weight] | Constituents | Particle size $D_{50}$ |
|---|---|---|
| 46.8 | Sintered α-alumina T60[1] | <0.5 mm |
| 47.6 | Binder system as per Table 13 | — |
| 5.6 | Make-up water | — |

[1]from Almatis GmbH, Germany

TABLE 13

Constitution of the hydraulic binder system

| Constitution of binder [% by weight] | Constituents | Particle size $D_{50}$ | Specific BET surface area [m$^2$/g] |
|---|---|---|---|
| 32.4 | A AO1 | 0.8 μm | 7.0 |
| 66.0 | A AO2 | 4.0 μm | 1.0 |
| 1.0 | B Magnesium oxide[1] | 3.0 μm | 16.3 |
| 0.6 | C Plasticizer system[2] | — | — |

[1]from Nedmag, The Netherlands
[2]66.7% by weight of polycarboxylic acid ether (PCE, for example obtainable as Viscocrete 225P (Sika) and 33.3% by weight of citric acid (reagent grade, Merck KGaA)

b) Calcium Hydroxide

TABLE 14

Constitution of the self-flowing α-alumina concretes

| Constitution of concrete [% by weight] | Constituents | Particle size $D_{50}$ |
|---|---|---|
| 46.8 | Sintered α-alumina T60[1] | <0.5 mm |
| 47.6 | Binder system as per Table 15 | — |
| 5.6 | Make-up water | — |

[1]from Almatis GmbH, Germany

TABLE 15

Constitution of the hydraulic binder system

| Constitution of binder [% by weight] | Constituents | | Particle size D$_{50}$ | Specific BET surface area [m$^2$/g] |
|---|---|---|---|---|
| 32.4 | A | AO1 | 0.8 μm | 7.0 |
| 65.7 | A | AO2 | 4.0 μm | 1.0 |
| 1.3 | B | Calcium hydroxide[1] | 3.6 μm | 13.0 |
| 0.6 | C | Plasticizer system[2] | — | — |

[1]reagent grade, Nekablanc Kalkfabrik Netstal AG, Switzerland
[2]66.7% by weight of polycarboxylic acid ether (PCE, for example obtainable as Viscocrete 225P (Sika) and 33.3% by weight of citric acid (reagent grade, Merck KGaA)

c) Strontium Hydroxide

TABLE 16

Constitution of the self-flowing α-alumina concretes

| Constitution of concrete [% by weight] | Constituents | Particle size D$_{50}$ |
|---|---|---|
| 46.5 | Sintered α-alumina T60[1] | <0.5 mm |
| 47.9 | Binder system as per Table 17 | — |
| 5.6 | Make-up water | — |

[1]from Almatis GmbH, Germany

TABLE 17

Constitution of the hydraulic binder system

| Constitution of binder [% by weight] | Constituents | | Particle size D$_{50}$ | Specific BET surface area [m$^2$/g] |
|---|---|---|---|---|
| 32.4 | A | AO1 | 0.8 μm | 7.0 |
| 65.8 | A | AO2 | 4.0 μm | 1.0 |
| 2.5* | B | Sr(OH)$_2$ × 8 H$_2$O[1] | 13.0 μm | 5.0 |
| 0.6 | C | Plasticizer system[2] | — | — |

*corresponds to 1.1% by weight of hydrate-free Sr(OH)$_2$
[1]reagent grade
[2]66.7% by weight of polycarboxylic acid ether (PCE, for example obtainable as Viscocrete 225P (Sika) and 33.3% by weight of citric acid (reagent grade, Merck)

d) Barium Hydroxide

TABLE 18

Constitution of the self-flowing α-alumina concretes

| Constitution of concrete [% by weight] | Constituents | Particle size D$_{50}$ |
|---|---|---|
| 46.5 | Sintered α-alumina T60[1] | <0.5 mm |
| 47.9 | Binder system as per Table 19 | — |
| 5.6 | Make-up water | — |

TABLE 19

Constitution of the hydraulic binder system

| Constitution of binder [% by weight] | Constituents | | Particle size D$_{50}$ | Specific BET surface area [m$^2$/g] |
|---|---|---|---|---|
| 32.4 | A | AO1 | 0.8 μm | 7.0 |
| 65.8 | A | AO2 | 4.0 μm | 1.0 |

TABLE 19-continued

Constitution of the hydraulic binder system

| Constitution of binder [% by weight] | Constituents | | Particle size D$_{50}$ | Specific BET surface area [m$^2$/g] |
|---|---|---|---|---|
| 2.1* | B | Ba(OH)$_2$ × 8 H$_2$O[1] | 12.0 μm | 8.0 |
| 0.6 | C | Plasticizer system[2] | — | — |

*corresponds to 1.1% by weight of hydrate-free Ba(OH)$_2$
[1]reagent grade
[2]66.7% by weight of polycarboxylic acid ether (PCE, for example obtainable as Viscocrete 225P (Sika) and 33.3% by weight of citric acid (reagent grade, Merck KGaA)

Experimental Procedure

A homogeneous slip was firstly produced from the calcined aluminas by addition of plasticizer system and make-up water and intensive mixing. This slip was subsequently mixed with the sintered α-alumina particles. The alkaline earth metal component was subsequently added. For test purposes, a mixture without addition of activator was also produced. The finished concrete mixture was poured into plastic molds and stored at room temperature in a closed container for 24 hours. The setting time of the mixture was determined by means of the Vicat test. Apparent density (from the weight and volume of the test specimen) and cold compressive strength were determined on the set and demolded test specimens (46×46 mm). The results achieved are summarized in Table 20.

TABLE 20

Influence of various alkaline earth metal oxides/hydroxides on the setting behavior of α-alumina concretes

| Oxide/ hydroxide | Amount added to concrete [% by weight] | Solubility in H$_2$O [g/l at 20° C.] | ST [min] | CCS [N/mm$^2$] | AD [g/cm$^3$] |
|---|---|---|---|---|---|
| MgO | 0.5 | 0.009 | 1440 | 2.8 | 3.17 |
| Ca(OH)$_2$ | 0.6 | 1.7 | 20 | 2.2 | 3.11 |
| Sr(OH)$_2$ × 8 H$_2$O | 1.1 | 20.0 | 210 | 1.6 | 3.12 |
| Ba(OH)$_2$ × 8 H$_2$O | 1.1 | 72.0 | 360 | 1.3 | 3.12 |

ST = setting time,
CCS = cold compressive strength,
AD = apparent density

It was able to be shown that no setting of the α-alumina concrete occurred without addition of an activator, but setting occurred in every case with addition of an activator. Here, magnesium oxide developed the greatest binding force (greatest compressive strength). A reduction in the binding force and lengthening of the setting time were associated with increasing solubility of the oxides/hydroxides.

Example 5: Influence of the Amount of Calcium Hydroxide on the Setting Behavior of α-Alumina Concrete

TABLE 21

Constitution of the self-flowing α-alumina concretes

| Constitution of concrete [% by weight] | Constituents | Particle size D$_{50}$ |
|---|---|---|
| 46.58-46.47 | Sintered α-alumina T60[1] | <0.5 mm |
| 46.90-47.03 | Binder system as per Table 22 | — |
| 6.52-6.50 | Make-up water | — |

[1]from Almatis GmbH, Germany

TABLE 22

Constitution of the hydraulic binder system

| Constitution of binder [% by weight] | | Constituents | Particle size $D_{50}$ | Specific BET surface area [m²/g] |
|---|---|---|---|---|
| 66.14-65.81 | A | AO3 | 2 μm | 1.7 |
| 33.16-33.00 | A | AO1 | 0.8 μm | 7.0 |
| 0.11-0.59 | B | Ca(OH)$_2$[1] | 3.6 μm | 13.0 |
| 0.60-0.59 | C | Plasticizer system[2] | — | — |

[1]Nekablanc Kalkfabrik Netstal AG, Switzerland
[2]from 65 to 87.5% by weight of polycarboxylic acid ether (PCE), from 12 to 32.5% by weight of citric acid, from 0.1 to 1.4% by weight of amidosulfonic acid, from 0.1 to 1.4% by weight of silicon dioxide (for example 66.7% by weight of CASTAMENT FS 20 and 33.3% by weight of Castament FS 10, both obtainable from BASF SE).

Experimental Procedure

A homogeneous slip was firstly produced from the calcined aluminas by addition of plasticizer system and make-up water and intensive mixing. This slip was subsequently mixed with the sintered α-alumina particles. The Ca(OH)$_2$ activator was subsequently added. The finished concrete mixture was poured into plastic molds and stored at room temperature in a closed container for 24 hours. The setting time of the mixture was determined by means of the Vicat test. Apparent density (from the weight and volume of the test specimen) and cold compressive strength were determined on the set and demolded test specimens (46×46 mm). The results are shown in Table 23.

TABLE 23

Influence of the amount of Ca(OH)$_2$ added on the properties of the α-alumina concretes

| Amount of Ca(OH)$_2$ added to concrete [% by weight] | Setting time [min] | Apparent density [g/cm³] | Cold compressive strength [N/mm²] |
|---|---|---|---|
| 0.05 | 1500 | 3.08 | 0.9 |
| 0.09 | 390 | 3.08 | 1.8 |
| 0.19 | 45 | 3.01 | 1.8 |
| 0.23 | 35 | 3.08 | 2.3 |
| 0.28 | 10 | 3.03 | 2.2 |

It was able to be shown that even small amounts of Ca(OH)$_2$ bring about solidification of the α-alumina concrete. The setting time and the strength of the set test specimens could be set via the amount added.

Example 6: Influence of Coating of the Calcined Aluminas

TABLE 24

Constitution of the self-flowing α-alumina concrete

| Constitution of concrete [% by weight] | Constituents | Particle size $D_{50}$ |
|---|---|---|
| 46.8 | Sintered α-alumina T60[1] | <0.5 mm |
| 47.6 | Binder system as per Table 25 | — |
| 5.6 | Make-up water | — |

[1]from Almatis GmbH, Germany

TABLE 25

Constitution of the hydraulic binder system

| Constitution of binder [% by weight] | | Constituents | Particle size $D_{50}$ | Specific BET surface area [m²/g] |
|---|---|---|---|---|
| 32.4 | A | AO1, coated[1] | 0.8 μm | 7.0 |
| 66.0 | A | AO2, coated[1] | 4.0 μm | 1.0 |
| 1.0 | B | Magnesium oxide[2] | 3.0 μm | 16.3 |
| 0.6 | C | Plasticizer system[3] | — | — |

[1]phosphorus content 0.063% by weight
[2]caustic calcined, from Nedmag, the Netherlands
[3]from 65 to 87.5% by weight of polycarboxylic acid ether, from 12 to 32.5% by weight of citric acid, from 0.1 to 1.4% by weight of amidosulfonic acid, from 0.1 to 1.4% by weight of silicon dioxide (for example 66.7% by weight of CASTAMENT FS 20 and 33.3% by weight of CASTAMENT FS 10, both obtainable from BASF SE).

Experimental Procedure

A mixture of AO1 and AO2 in a weight ratio of 16.5:33.5 was homogeneously mixed at room temperature with a dilute technical-grade phosphoric acid having a concentration of 0.74%. The amount of dilute H$_3$PO$_4$ was selected so that 0.002 g of H$_3$PO$_4$ were used per g of Al$_2$O$_3$. The mixture was subsequently dried at 110° C. and used for producing the concrete test specimens.

A homogeneous slip was firstly produced from the coated calcined alumina mixture by addition of plasticizer system and make-up water and intensive mixing. This slip was subsequently mixed with the sindered α-alumina particles. The magnesium oxide was subsequently added. The finished concrete mixture was poured into plastic molds and stored at room temperature in a closed container for 27 hours. The setting time of the mixture was determined by means of the Vicat test. Apparent density (from the weight and volume of the test specimen) and cold compressive strength were determined on the set and demolded test specimens (46×46 mm). For comparison, an α-alumina concrete made from the corresponding uncoated aluminas was examined. The results achieved are shown in Table 26.

TABLE 26

Influence of phosphoric acid on the setting behavior in an α-alumina concrete

| Calcined aluminum oxides | Cold compressive strength [N/mm²] | Apparent density [g/cm³] | Setting time [min] |
|---|---|---|---|
| uncoated | 3.6 | 3.10 | 70 |
| coated* | 4.8 | 3.11 | 120 |

*corresponds to 0.068% by weight of P$_2$O$_5$ in the α-alumina concrete

It was able to be shown that the use of coated calcined aluminas brings about a considerable improvement in the binding force. This becomes apparent from the increase in the cold compressive strength of the set concretes by more than 30%. It was also able to be shown that the setting time of the concrete is appreciably increased by use of a coated alumina.

Example 7: Characterization of the Binder System of the Invention in Terms of the Use Properties of α-Alumina Concretes Produced Therefrom

TABLE 27

Constitution of the α-alumina concrete "Novel hydraulic binder 1% MgO"

| Constitution of concrete [% by weight] | Constituents | Particle size $D_{50}$ |
|---|---|---|
| 29.2 | Sintered α-alumina T60[1] | 1-3 mm |
| 21.37 | Sintered α-alumina T60[1] | 0.5-1 mm |
| 4.58 | Sintered α-alumina T60[1] | <0.5 |
| 12.25 | Sintered α-alumina T60[1] | <45 μm |
| 28.02 | Binder system as per Table 7.b | — |
| 4.58 | Make-up water | — |

[1] from Almatis GmbH, Germany

TABLE 28

Constitution of the hydraulic binder system of the invention

| Constitution of binder [% by weight] | | Constituents | Particle size $D_{50}$ | Specific BET surface area [m²/g] |
|---|---|---|---|---|
| 32.6 | A | AO1 | 0.8 μm | 7.0 |
| 66.2 | A | AO2 | 4.0 μm | 1.0 |
| 1.0 | B | Magnesium oxide[2] | 3.0 μm | 16.3 |
| 0.2 | C | Plasticizer system[3] | 0.8 μm | 7.0 |

[2] caustic calcined, from Nedmag, the Netherlands
[3] 50% by weight of trisodium citrate, reagent grade, 50% by weight of polycarboxylic acid ether (PCE, for example obtainable as Viscocrete 225 P (Sika))

TABLE 29

Constitution of the α-alumina concrete "Novel hydraulic binder 3% MgO"

| Constitution of concrete [% by weight] | Constituents | Particle size $D_{50}$ |
|---|---|---|
| 29.2 | Sintered α-alumina T60[1] | 1-3 mm |
| 21.37 | Sintered α-alumina T60[1] | 0.5-1 mm |
| 4.58 | Sintered α-alumina T60[1] | <0.5 |
| 12.25 | Sintered α-alumina T60[1] | <45 μm |
| 28.02 | Binder system as per Table 7.d | — |
| 4.58 | Make-up water | — |

[1] from Almatis GmbH, Germany

TABLE 30

Constitution of the hydraulic binder system of the invention

| Constitution of binder [% by weight] | | Constituents | Particle size $D_{50}$ | Specific BET surface area [m²/g] |
|---|---|---|---|---|
| 31.83 | A | AO1 | 0.8 μm | 7.0 |
| 64.6 | A | AO2 | 4.0 μm | 1.0 |
| 3.33 | B | Magnesium oxide[2] | 3.0 μm | 16.3 |
| 0.24 | C | Plasticizer system[3] | 0.8 μm | 7.0 |

[2] caustic calcined, from Nedmag, the Netherlands
[3] 57% by weight of trisodium citrate, reagent grade, 43% by weight of polycarboxylic acid ether (PCE, for example obtainable as Viscocrete 225 P (Sika))

Experimental Procedure

All constituents of the formulation apart from water were firstly premixed dry for one minute, ⅔ of the water was subsequently added and the mixture was mixed for 3 minutes. Finally, the remainder of the water was added and the mixture was mixed until the composition became flowable (about 2 minutes).

Consistency and Setting Time:

The consistency of the vibration concretes prepared in this way was determined by means of the slump flow (DIN EN 1402-4). After determination of the consistency, the concrete was taken up and stored in a closed plastic container. The determination of the consistency was repeated every 30 minutes until the concrete had set.

TABLE 31

Consistency and setting time of the α-alumina concretes

| Designation of the concrete | Slump flow [%] | Setting time [h] |
|---|---|---|
| Novel hydraulic binder 1% MgO | 130 | 4.5 |
| Novel hydraulic binder 3% MgO | 130 | 10 |

As can be seen from Table 31, the α-alumina concretes display practicable processing properties when they are produced using the hydraulic binder system of the invention.

Drying Behavior:

1 kg of fresh concrete was in each case introduced into a plastic bucket and allowed to cure at room temperature with exclusion of air for 24 hours. The buckets were then opened and dried to constant weight at 110° C. in a drying oven. During this, the mass of the concrete samples was determined regularly.

TABLE 32

Water addition, total loss on drying and chemically bound water in the set α-alumina concretes (the latter determined from the difference between the first two.)

| Designation of the concrete | Water addition [%] | Total loss on drying [%] | Chemically bound water [%] |
|---|---|---|---|
| Novel hydraulic binder 1% MgO | 4.58 | 4.25 | 0.33 |
| Novel hydraulic binder 3% MgO | 4.58 | 3.99 | 0.59 |

The binder system of the invention binds significantly less water in hydrates than does cement.

The novel, hydraulic binder system of the invention leads to a concrete having a high permeability of the microstructure. Drying was concluded after only 24 hours. This property of the binder system of the invention allows short manufacturing cycles for finished refractory concrete parts and rapid heating-up curves in the case of monolithic refractory linings.

Density and Strength:

In addition, the concrete mixtures which had been prepared in this way were poured into plastic molds and stored at room temperature in a closed container for 24 hours. The test specimens were dried at 110° C. for 24 hours. Part of the test specimens were then fired for three hours at 1000° C. or 1500° C. Apparent density (from the weight and volume of the test specimen), the shrinkage and cold compressive strength were determined on dried and fired test specimens (46×46 mm).

TABLE 33

Cold compressive strength, apparent density and drying shrinkage
of the α-alumina concretes dried at 110° C.

| Designation of the concrete | Cold compressive strength [N/mm²] | Apparent density [g/cm³] | Drying shrinkage [%] |
|---|---|---|---|
| Novel hydraulic binder 1% MgO | 7 | 3.06 | 0.02 |
| Novel hydraulic binder 3% MgO | 18 | 3.04 | 0.05 |

TABLE 34

Cold compressive strength, apparent density and drying shrinkage
of the α-alumina concretes fired at 1000° C.

| Designation of the concrete | Cold compressive strength [N/mm²] | Sintered density [g/cm³] | Firing shrinkage [%] |
|---|---|---|---|
| Novel hydraulic binder 1% MgO | 16 | 3.06 | 0.04 |
| Novel hydraulic binder 3% MgO | 23 | 3.04 | 0.05 |

TABLE 35

Cold compressive strength, apparent density and drying shrinkage
of the α-alumina concretes fired at 1500° C.

| Designation of the concrete | Cold compressive strength [N/mm²] | Sintered density [g/cm³] | Firing shrinkage [%] |
|---|---|---|---|
| Novel hydraulic binder 1% MgO | 110 | 3.08 | 0.11 |
| Novel hydraulic binder 3% MgO | 130 | 3.10 | 0.09 |

The apparent density of the concretes containing the binder system of the invention is at the level of other α-alumina concretes according to the prior art. The drying shrinkage is minimal. Growth due to hydration, as occurs at high contents of rho alumina, does not occur in the case of the binder system of the invention. The strength of the concrete produced using the hydraulic binder system of the invention is in the low, practicable range. After firing at 1000° C. or 1500° C., the strength of the concretes produced using the hydraulic binder system of the invention is comparable to the strength of concretes produced using binders according to the prior art. The low firing shrinkage has a positive effect on the stability of refractory linings since cracks can be caused by an excessive firing shrinkage.

High-Temperature Strength:

Test cubes having an edge length of 25 mm were prepared from test specimens fired at 1500° C. using a diamond saw in order to determine the hot compressive strength. The hot compressive strength was determined at 1450° C.

TABLE 36

Hot compressive strength measured at 1450° C. of the α-alumina
concretes fired at 1500° C.

| Designation of the concrete | Hot compressive strength [N/mm²] |
|---|---|
| Novel hydraulic binder 1% MgO | 31.3 |
| Novel hydraulic binder 3% MgO | 59.2 |

The hot compressive strength of all concretes is at a very high level.

Corrosion Resistance:

In addition, the concrete mixtures which had been prepared in this way were poured into cylindrical crucible molds having a diameter of 50 mm and a height of 65 mm. The cylindrical depression in the crucibles had a diameter of 23 mm and a depth of 35 mm. The crucibles were cured at room temperature for 24 hours, dried at 110° C. for 24 hours and fired at 1500° C. for 3 hours. The crucibles were then filled with 17 g of slag and once again maintained at 1500° C. for 3 hours. The crucibles were subsequently cut through by means of a diamond saw and the cut surfaces were evaluated. Corrosion depth and infiltration depth of the slag into the refractory material were measured in 8 places and the arithmetic mean was formed.

TABLE 37

Chemical analysis of the slags used:

| Oxide | Content [%] |
|---|---|
| $Fe_2O_3$ | 36 |
| CaO | 29 |
| $SiO_2$ | 20 |
| $PO_4$ | 6 |
| $Al_2O_3$ | 6 |
| $Mn_2O_3$ | 1.5 |
| MgO | 1.5 |

TABLE 38

Results of the slag tests

| Designation of the concrete | Corrosion depth | Infiltration depth |
|---|---|---|
| Novel hydraulic binder 1% MgO | <0.1 mm | 4.2 mm |
| Novel hydraulic binder 3% MgO | <0.1 mm | 3.1 mm |

The crucibles containing the binder system of the invention display little reaction with the slag since these concretes contain no cement and thus no calcium oxide. The volume of the slag has remained virtually completely in the crucible and not penetrated into the refractory material. The infiltration depth is very small and corrosion has effectively not taken place.

The invention claimed is:

1. A hydraulic binder system for use in refractory materials, comprising
    a) from 90.0 to 99.99% by weight of at least one calcined aluminum oxide A having an average particle size of from 0.3 to 25.0 µm and a BET surface area of from 0.5 to 30.0 m²/g; and
    b) from 0.01 to 10.0% by weight of at least one component B selected from the group consisting of magnesium hydroxide, calcium hydroxide, strontium hydroxide, barium hydroxide and hydrates thereof, magnesium oxide, calcium oxide, strontium oxide and barium oxide;
    where the respective proportions by weight are based on the total amount of the hydraulic binder system.

2. The binder as claimed in claim 1, characterized in that from 0.05 to 4.95% by weight of at least one plasticizer C is additionally present.

3. The binder system as claimed in claim 1, characterized in that the at least one calcined aluminum oxide A is a) at least one calcined aluminum oxide A1 having an average particle size of from 1.8 to 8.0 μm and a specific BET surface area of from 0.5 to 2.0 m²/g; or b) at least one calcined aluminum oxide A2 having an average particle size of from 0.3 to 1.7 μm and a specific BET surface area of from 2.0 to 10.0 m²/g.

4. The binder system as claimed in claim 1, characterized in that at least two different calcined aluminum oxides A are present.

5. The binder system as claimed in claim 4, characterized in that a) at least one calcined aluminum oxide A1 having an average particle size of from 1.8 to 8.0 μm and a specific BET surface area of from 0.5 to 2.0 m²/g; and b) at least one calcined aluminum oxide A2 having an average particle size of from 0.3 to 1.7 μm and a specific BET surface area of from 2.0 to 10.0 m²/g are present.

6. The binder system as claimed in claim 1, characterized in that at least one aluminum oxide A is coated.

7. The binder system as claimed in claim 1, characterized in that at least one aluminum oxide A is coated, with the coating agent being phosphoric acid.

8. The binder system as claimed in claim 1, characterized in that the component B has an average particle size of from 1.0 to 20.0 μm and a BET surface area of from 0.5 to 50.0 m²/g.

9. The binder system as claimed in claim 1, characterized in that the at least one component B is a magnesium oxide.

10. The binder system as claimed in claim 1, characterized in that the at least one component B is a calcium hydroxide.

11. The binder system as claimed in claim 1, characterized in that the at least one component B is a strontium hydroxide or hydrate thereof.

12. The binder system as claimed in claim 1, characterized in that the at least one component B is a barium hydroxide or hydrate thereof.

13. The binder system as claimed in claim 2, characterized in that the at least one plasticizer C is trisodium citrate.

14. A process for producing a hydraulic binder system as claimed in claim 1, comprising the step:

a) mixing of from 90.0 to 99.99% by weight of at least one calcined aluminum oxide A having an average particle size of from 0.3 to 25.0 μm and a BET surface area of from 0.5 to 30.0 m²/g; with from 0.01 to 10.0% by weight of at least one component B, selected from the group consisting of magnesium hydroxide, calcium hydroxide, strontium hydroxide, barium hydroxide and hydrates thereof, magnesium oxide, calcium oxide, strontium oxide and barium oxide;

where the respective proportions by weight are based on the total amount of the hydraulic binder system.

15. The process as claimed in claim 14, characterized in that from 0.05 to 4.95% by weight of at least one plasticizer C is added during or after step a).

16. The process as claimed in claim 14, characterized in that the mixing of the at least one calcined aluminum oxide A with the at least one component B and optionally at least one plasticizer C in step a) is carried out by joint milling.

17. The use method of using a hydraulic binder system as claimed in claim 1 in refractory materials and fine-ceramic materials.

* * * * *